Nov. 8, 1966          H. FROESE          3,283,648
SWITCHING MECHANISM FOR MICROFILM FLOW TYPE CAMERAS
Filed Oct. 9, 1963          4 Sheets-Sheet 1
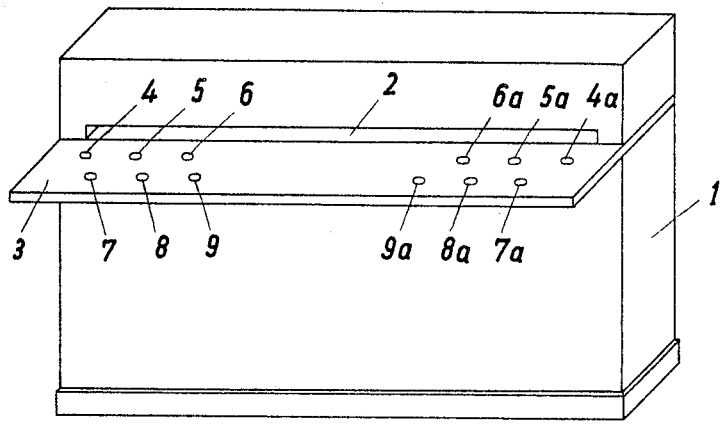
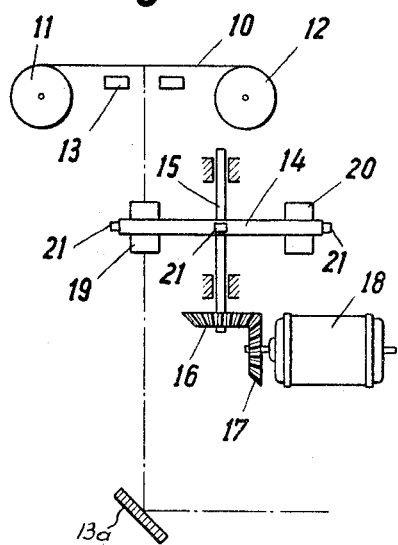
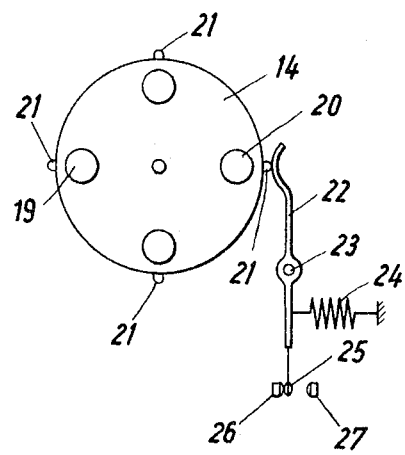
Inventor:
HERBERT FROESE
by Arthur O. Klein
Attorney Inventor:
HERBERT FROESE
by Arthur O. Klein
Attorney Nov. 8, 1966  H. FROESE  3,283,648
SWITCHING MECHANISM FOR MICROFILM FLOW TYPE CAMERAS
Filed Oct. 9, 1963  4 Sheets-Sheet 3

Inventor:
HERBERT FROESE
by: Arthur O. Klein
Attorney

Inventor:
Herbert FROESE
by: Arthur O. Klein
his Attorney 3,283,648
SWITCHING MECHANISM FOR MICROFILM
FLOW TYPE CAMERAS
Herbert Froese, Berlin, Germany, assignor, by mesne assignments, to Agfa-Gevaert A.G., Leverkusen, Germany, a corporation of Germany
Filed Oct. 9, 1963, Ser. No. 315,433
Claims priority, application Germany, Mar. 30, 1960,
P 24,706
7 Claims. (Cl. 88—24)

This is a continuation-in-part patent application of my patent application Serial No. 98,175, filed in the United States Patent Office on March 24, 1961 and now abandoned.

This invention relates generally to microfilm flow type cameras, and more particularly to microfilm flow type cameras adapted for the reproduction of blueprints, drawings, printed matter etc. wherein the objective lens of the device is interchangeable.

Flow type microfilm cameras of the above-described character fall into two groups: (a) a camera which reproduces simultaneously both sides of an object placed in the camera; and (b) a camera which reproduces only one side of an object placed in the camera. The subject matter of this invention concerns itself with cameras pertaining to the above-described category (b).

When reproducing drawings, blueprints and printed matter of different sizes, and particularly of varying widths, with the same camera, it is usually necessary to use objective lenses having correspondingly different focal lengths. Heretofore, this requirement was met in the flow type cameras be making the objective lens interchangeable. In these known type of flow cameras, the objective lens is mounted in a special container and can be interchanged by opening the camera. This procedure, however, has proven to be cumbersome and time-consuming and has the added disadvantage of exposing a portion of the belt type emulsion carrier, or sensitized film, used in this type of camera.

The interchanging of the objective lenses of different focal lengths in a flow type camera necessitates a corresponding change of the running speed of the driving mechanism of the camera, that is to say a corresponding adjustment of the traversing speed of the emulsion carrier or of the object that is to be reproduced, depending on the operation the camera performs. This adjustment was heretofore effected in the known type of flow cameras by again opening the camera and transferring belt drives, switching gear trains, etc. It is also known to effect this adjustment by exchanging the belt drive cylinder for the emulsion carrier with a belt drive cylinder of different diameter.

The selection of the correct running speed of the driving mechanism depends on the width of the object to be reproduced, as has already been pointed out above. The measuring of the width of the object is facilitated by markings in the traversing speed and objective lens to be selected which is done by opening up the camera as pointed out above. This procedure has proven to be cumbersome as well as time-consuming. Furthermore, it frequently resulted in errors of selection. Also the person servicing the camera was required to supervise and adjust three different parts of the machine and coordinate these parts with each other. An error in properly adjusting the machine generally resulted in a complete loss of the entire belt type emulsion carrier, because the error would usually be discovered only at the end of the run of the emulsion carrier.

It is therefore a general object of this invention to provide a flow type microfilm camera which reduces the chances of malfunction due to error of adjustment to a minimum.

It is another object of this invention to provide a flow type microfilm camera wherein the selection of the correct speed and objective lens is completely automatic.

The above described objects are obtained by providing the camera with an impulse transmitter, and several relay units operatively connected thereto. A plurality of selective adjustments of this impulse transmitter cause (a) the lighting of a selected pair of markings (lamps), the distance between which corresponds to at least the width of the object to be reproduced, (b) the transfer of the objective lens corresponding to the selected width (distance between the selected pair of markings) to the exposure light beam and (c) the correct adjustment of the traversing speed of the belt drive for the emulsion carrier of the object to be reproduced, depending on the operation the camera is performing.

This impulse is transmitted by preferably manually depressing one or more contacts located conveniently on an instrument panel of the camera. It is, however, not without the scope of this invention to transmit this impulse by scanning the object to be reproduced by electrooptical means, such as an electrooptical cell relay, which will then transmit the aforementioned electrical impulses. The plurality of pairs of border markings are mounted near the feed entrance of the camera. Each pair of border markings indicate a specific width corresponding to a specific objective lens and traversing speed of the emulsion carrier or object to be reproduced. The transfer of the appropriate objective lens to a point opposite the exposure light beam is effected by electro-mechanical means which are switched on by the impulse transmitter and disconnected by a limit switch. The traversing speed of the emulsion carrier or the object to be reproduced must have the same number of velocity stages as there are objective lenses in the device, whereby each object to be reproduced of a particular width corresponds to a particular traversing speed. The impulse transmitter serves also to switch on the correct driving velocity of the emulsion carrier to light the corresponding pair of border markings and causes the transfer of a corresponding objective 1 lens to a point opposite the exposure light beam. The belt drive cylinder of the camera, forming part of this invention, can be exchanged with a belt drive cylinder of different width, so that emulsion carriers of different widths may be used with this machine. The camera forming part of my invention may have electrical switch means which are connected to two groups of pairs of border markings. The same electrical switch means also control the movement of the objective lens carrying disc, as well as the traversing speed of the belt type emulsion carrier or the object to be reproduced. The movement of the objective lenses which are mounted on a rotatable disc is effected by means of an electrical motor via a reduction gear train. Alternately, the objective lenses may be mounted one behind the other on a sliding carriage which is movable by electro-mechanical means. Two shafts are rotatably mounted in the camera, one of which carries a plurality of wheels of different diameter corresponding to the number of velocity stages. The other shaft carries a plurality of electromagnetic clutches which selectively connect one of the drive wheels on the other shaft with an electrical drive motor. In this manner the traversing velocity of the belt type emulsion carrier or object to be reproduced is adjusted.

The novel features which are considered as characteristic for the invention, are set forth in particular in the appended claims. The invention itself, however, both as to its construction and its method of operation, together with additional objects and advantages thereof, will be best understood from the following description when read in connection with accompanying drawings in which:

FIG. 1 is a schematic view, in perspective, of the camera forming part of my invention;

FIG. 2 is a schematic illustration of the emulsion carrier, the driving mechanism for the objective lens carrying disc and the exposure light beam;

FIG. 3 is a schematic plan view of the objective lens carrying disc and the limit switch associated therewith;

Figure 4:
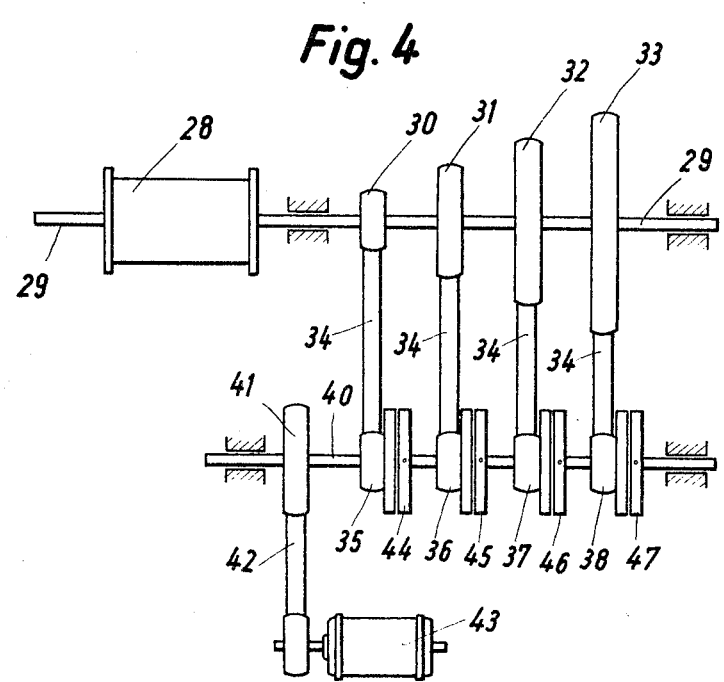
FIG. 4 illustrates schematically the driving mechanism for the various operating speeds of the device.

Referring now to the drawings, in FIG. 1 is illustrated the camera housing 1 which is provided with a feed entrance 2 on a feed table 3. A first group of pairs of border markings 4, 4a, 5, 5a and 6, 6a are arranged on the table 3 adjacent to the feed entrance 2. A second group of pairs of border markings 7, 7a, 8, 8a and 9, 9a is arranged in staggered relationship to the first group on the feed table 3 adjacent to the first group.

Figure 8:
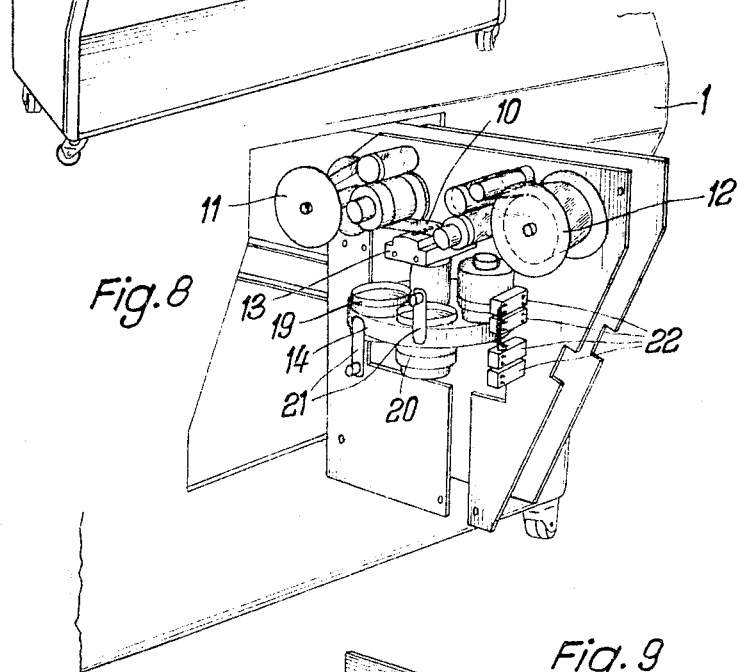
FIG. 8 is an illustration in perspective of the emulsion carrier driving mechanism, the objective lens carrying disc and the limit switch associated therewith.
Figure 9:
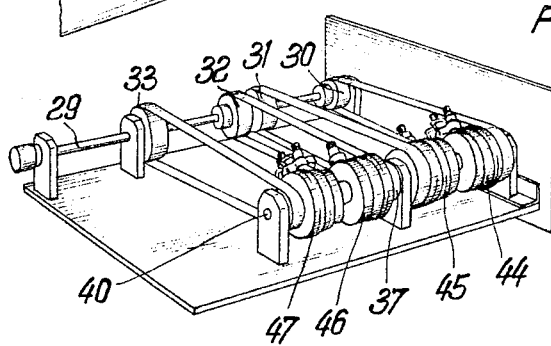
FIG. 9 is an illustration in perspective of the driving mechanism for the various operating speeds of the emulsion carrier driving mechanism.

FIG. 2 schematically illustrates a belt type emulsion carrier 10, or sheet on which an image is to be reproduced or recorded, which runs from belt drive cylinder 11 to belt drive cylinder 12. For example, images from a blueprint may be reproduced or recorded on the emulsion carrier 10. Both of the aforesaid cylinders, 11 and 12, are rotatably mounted in the housing 1 parallel to the feed entrance 2. A slit 13 is arranged adjacent to the emulsion carrier 10 and serves to guide the exposure light beam, indicated in FIG. 2 by the dotted and dashed line, via the mirror 13a and an objective lens 19, 20, etc. to the emulsion carrier. An objective lens carrying disc 14 is rotatably mounted in the camera by means of a shaft 15 having a bevel gear 16 mounted at its end. A bevel gear 17 mounted on the drive shaft of an electrical motor 18 meshingly engages the bevel gear 16. The motor 18 drives, therefore, the disc 14 via the bevel gears 16 and 17 and the shaft 15. A plurality of objective lenses 19, 20 etc. are mounted on the carrying disc 14. In FIG. 2 only two objective lenses 19 and 20 are illustrated for the sake of clarity whereas actually 4 lenses may be carried by disc 14 as illustrated in FIGS. 3 and 8. A plurality of cams 21 project from the circumference of the carrying disc 14. Each cam is located on the perimeter of disc 14 opposite one of the objective lenses.

FIG. 3 illustrates a contact lever 22 pivoted on support 23 which is urged against the perimeter of disc 14 by means of a spring 24. A contact finger 25 which is movable with the contact lever 22 projects between two fixed electrical contacts 26 and 27. In FIG. 3 the finger 25 abuts against contact 26 due to the action of cam 21 on the lever 22. After the cam 21 has passed the lever 22, due to rotation of the disc 14, the finger 25 is urged again against the contact 27 by the biasing spring 24.

FIG. 4 shows a belt drive cylinder 28 for the belt-type emulsion carrier 10. The belt drive cylinder 28 corresponds to the belt drive cylinder 11 or 12, schematically shown in FIG. 2 and shown in perspective in FIG. 8. As indicated, the cylinder 28 is secured on a rotatable shaft 29 in the camera housing 1. In addition thereto four belt drive pulleys 30, 31, 32 and 33 are fixedly supported side by side on the shaft 29. Four belts 34 respectively connect pulleys 30, 31, 32 and 33 to pulleys 35, 36, 37 and 38 loosely mounted side by side on rotatable shaft 40 opposite shaft 29. An additional pulley 41 is fixedly mounted on shaft 40 and is connected by means of belt 42 to drive motor 43. A plurality of electromagnetic clutches 44, 45, 46 and 47 are mounted on shaft 40. Each of the aforesaid clutches includes a portion which is rigidly respectively affixed with the belt pulleys 35, 36, 37 and 38, respectively. A second portion of each clutch 44–47 is affixed to the shaft 40. When the two portions of a clutch, as for example clutch 44, are electro-magnetically coupled the motor 43 drives, via the belt 42, the pulley 41, the shaft 40, said clutch 44, the pulley 35, the belt 34, the pulley 30, the shaft 29, and ultimately the belt drive cylinder 28 at a speed corresponding to the diameter of pulley 30.

Figure 5:
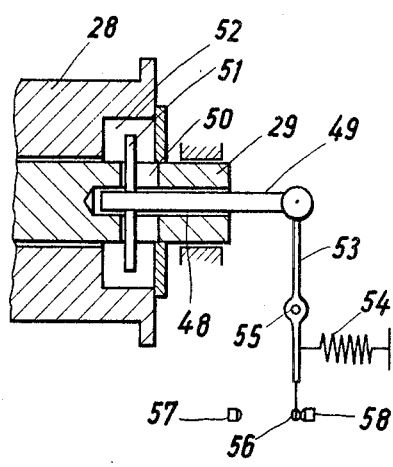
FIG. 5 is a schematic illustration in section of the support for one type of belt drive cylinder forming part of the invention.

In FIG. 5 the belt drive cylinder 28 is shown mounted on the shaft 29 and firmly connected thereto. Shaft 29 has a central bore 48 in which a rod 49 is slidably mounted. A crossbar 51 rigidly affixed to the rod 49 projects laterally into the radial opening 52 of the belt drive cylinder 28 where it can move back and forth. The rod 49 is pivotally connected to a lever 53. Lever 53 is pivoted on a support 55 and has contact finger 56 projecting between a pair of fixed contacts 57 and 58. A spring 54 biases the finger contact 56 against contact 58, as shown.

Figure 6:
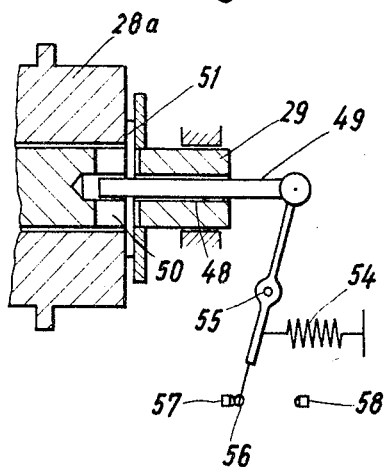
FIG. 6 is a schematic illustration in section of the support for another type of belt drive cylinder forming part of the invention.
Figure 7:
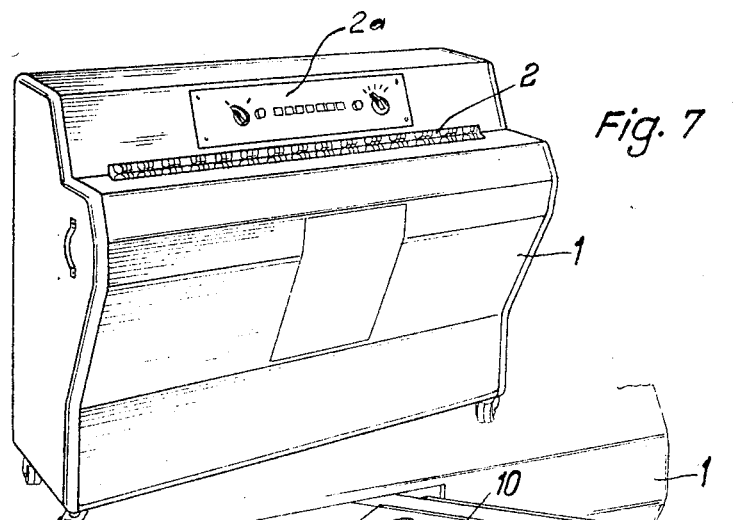
FIG. 7 is an illustration in perspective of the camera forming part of the invention.

In FIG. 6 a second embodiment of a belt drive cylinder 28a is illustrated which also forms part of this invention. This embodiment of the belt drive cylinder lacks the radial opening 52 of the belt drive of cylinder illustrated in FIG. 5. Due to the lack of the opening, the crossbar 51 together with rod 49 are axially displaced when the cylinder 28 is replaced by the cylinder 28a. The axial displacement of the rod 49 causes the lever 53 to pivot about the support 55 and, as a result, the finger contact 56 makes contact with the fixed contact 57, as shown.

Figure 10:
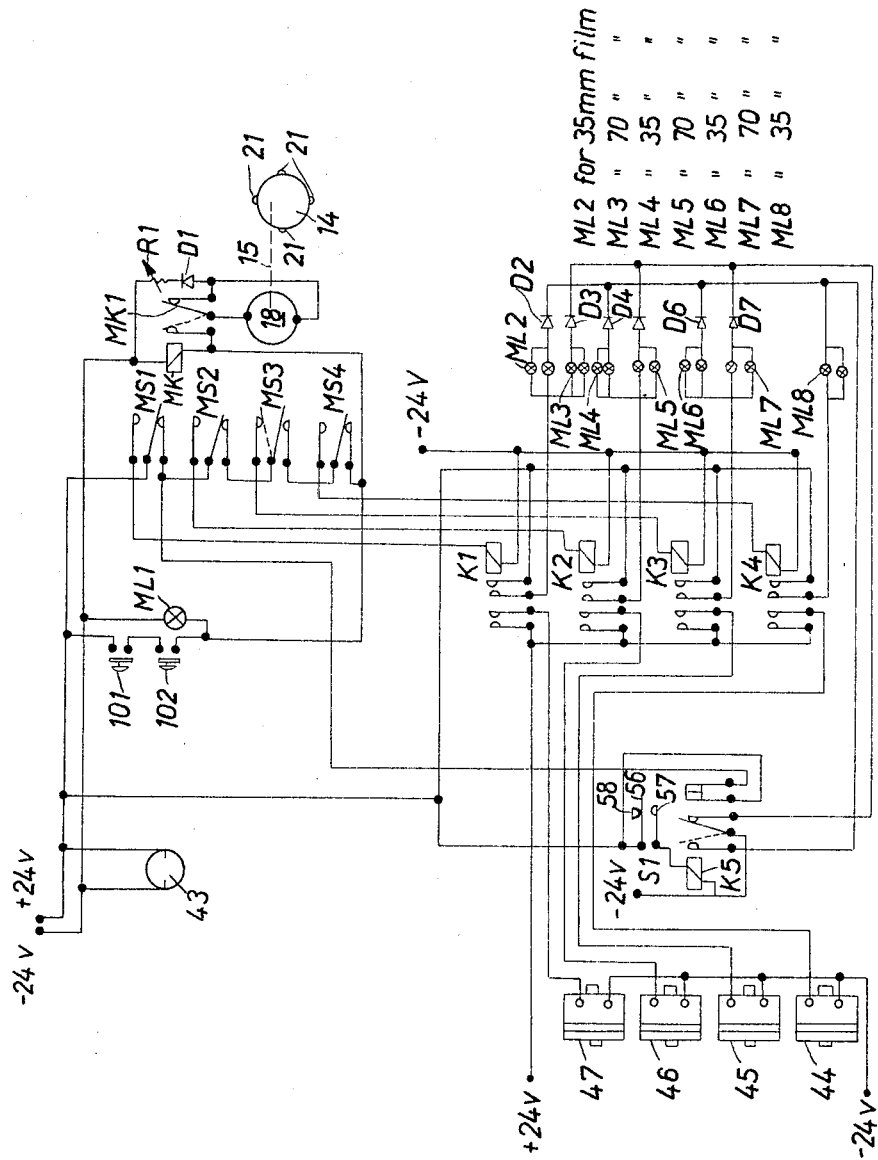
FIG. 10 is a simplified wiring diagram of the switching arrangement of the invention.

The electrical schematic of the present invention is shown in FIG. 10. As shown there, a voltage source is provided; for example, a 24 volt voltage source having a positive 24 volt terminal, +24 v., and a negative 24 volt terminal, −24 v. As shown, two impulse transmitters 101 and 102 in the form of momentary contact pushbuttons are connected in series with the +24 v. terminal of the voltage source and with a motor controlling relay MK; the other side of the coil of relay MK being connected with the −24 v. terminal of the voltage source. It is advantageous to use two pushbuttons such as 101 and 102 in series, as shown, because the machine operator is required to momentarily depress both pushbuttons 101 and 102 simultaneously to commence operation of the subject microfilm flow type camera. Accordingly, inadvertent or mistaken actuation of but one of the pushbuttons 101 or 102 prevents operation of the subject camera.

When the pushbuttons 101 and 102 are momentarily depressed simultaneously, the signal light M1 1 will provide the machine operator with a visual indication of the start of machine operation. Also, the relay MK will be energized and its associated movable contact MK1 will transfer MK1. The associated movable contact MK1 of relay MK moves to the position shown in the dotted line represented in (FIG. 10), thereby energizing the drive motor 18. As shown, there is connected in series with the drive motor 18 the diode D1 and the variable resistor R1. The variable resistor R1, or rheostat, is purposeful for enabling preadjustment of the speed of the motor 18. Of course, as the pushbuttons 101 and 102 are released, the relay MK is deenergized and, as a consequence, the motor 18 stops rotating. Therefore, as long as the operator depresses both pushbuttons 101 and 102 simultaneously, the drive motor 18 continues to run, thereby driving through the shaft 16 the objective lens disc 14. The pushbuttons 101 and 102 may have to be momentarily actuated simultaneously a number of times in order to bring the desired objective lens carried on the disc 14 into the appropriate position to focus light rays on the emulsion carrying belt 10 (see FIG. 2). When the appropriate desired objective lens, for example lens 19, is in the required position, the appropriate indicator lamps or marker lamps ML2 ... ML8 will become illuminated on the console, thereby providing the operator with a visual indication as to which objective lens is in the focusing position.

As indicated, four single-pole double-throw switch mechanisms MS1, MS2, MS3 and MS4 are provided. In the schematic shown in FIG. 10, these switches MS1 ... MS4 may be microswitches. However, they are equivalent to the cam operated lever or movable switch contact 25 cooperating with the fixed contacts 26 and 27, as shown at FIG. 3. These microswitches, which are designated by the reference number 22 in FIG. 8, may be mounted for actuation by the cams 21 (see FIG. 8). As indicated in FIG. 10, four such switches MS1 ... MS4 are provided and their movable contacts are normally in the positions indicated at FIG. 10.

Let it now be assumed that the motor 18 has rotated the disc 14 to bring the appropriate objective lens into position and that as a result the microswitch MS3 has its movable contact situated in the position shown in dotted line fashion in FIG. 10. As a result, electrical power from the +24 volt terminal passes through the respective movable and fixed contacts of the microswitches MS1, MS2 and MS3. Thereafter, energy from the +24 v. terminal energizes the coil of relay K3. The relay K3 has, as shown, two sets of normally open contacts associated therewith. Upon energization of the coil of relay K3, both of these sets of contacts close. One set of contacts, being in series with the +24 v. terminal, energizes the two signal lights, or marker lamps, ML6 and ML7 through their respective series connected diodes D6 and D7; the diodes D6 and D7 having, as indicated, one of their respective electrodes connected to the —24 v. terminal. The other set of normally open set of contacts associated with the relay K3 also close, and in so doing energize the electromagnetic clutch 45. As stated hereinbefore, the energization of the clutch 45 enables the film drive motor 43 through the mechanism illustrated in FIG. 4 to drive the cylinder 28 at the appropriate speed for the selected objective lens.

In the same manner as described, the rotation of the objective lens disc 14, by virtue of its cams 21, is also able to transfer the movable contacts of the microswitches MS1, MS2 or MS4.

If, for example, the microswitch MS1 is actuated, the relay K1 will become energized. As a result of the energization of relay K1, the marker lamps ML2 and ML3 will become illuminated. Also, the electromagnetic clutch 47 will become actuated.

In like manner, if the movable contact of the microswitch MS2 is transferred from the position shown in FIG. 10, the relay K2 will become energized. As a result of energizing relay K2, the marker lamps ML4 and ML5 will become illuminated. Also, the energization of relay K2 simultaneously energizes the electromagnetic clutch 46.

Similarly, if the movable contact of the microswitch ML4 is transferred, the relay K4 will become energized, thereby illuminating the marker lamp, or border lamp, ML8. Simultaneously, the energization of the relay K4 energizes the electromagnetic clutch 44.

In FIG. 10 the marker lamps ML2 ... ML8 correspond to the hereinbefore mentioned border markings 4, 4a ... 9, 9a.

As shown, each of the marker or signal lamps ML2 ... ML7 have the diodes D2 ... D7 serially connected therewith between the respective marker lamps and ultimately the negative potential —24 v. terminal.

Also as shown in FIG. 10, there is included an additional relay coil K5 which is connected in series between a switch S1 and the positive and negative voltage terminals. As shown, the switch S1 includes the movable contact 56 and the fixed contacts 57 and 58. When as shown at FIGS. 5 and 6, the drive cylinder 28 or 28a is used, as hereinbefore described, the movable switch contact 56 will be opened with respect to the fixed contact 57 or closed with respect thereto. When the contact 56 is closed with the fixed contact 57 as indicated by the dotted line representation in FIG. 10, the relay K5 is energized. For example, if 70 millimeter film is employed, the contact 56 is in the position shown; i.e., in contact with the fixed contact 58. As a result, the relay K5 will not be energized but the appropriate lens corresponding to the transfer of the movable contact of the microswitch MS4 and consequently the relay K4 are energized. But the marker light ML8 will not give a visible signal because the movable contact associated with the relay K5 has not been transferred to the dotted line position indicated in FIG. 10, thereby not completing a circuit through the marker lamp ML8 to the negative potential terminal. However, in the event that 35 mm. film is employed, the relay K5 will be energized due to the closure of the movable contact 56 against the fixed contact 57. As a result, the movable contact associated with the relay K5 will close to the dotted line position, thereby providing proper continuity for the marker lamp ML8 to be connected with the —24 v. terminal, and thereby become illuminated.

The operating principle of the camera will remain the same whether the speed of the belt-type emulsion carrier or the speed of the objective lens is adjusted. It is, however, simpler from a structural point of view to provide means for adapting the traversing speed of the belt-type emulsion carrier to the preselected objective lens.

Also, the belt drive cylinder 28, according to the invention may be interchanged for a belt drive cylinder 28a of a different width, so that the belt-type emulsion carrier of different width may be used with the device according to the invention. In this manner the camera may be used with all popular standard width belt-type emulsion carriers.

According to another embodiment of the invention, the camera housing 1 includes a built-in enlargement means adapted for enlarging photographs on standard width film mounted in the camera; such as 35 mm., 70 mm., etc. by reproducing them on the belt-type emulsion carrier which is manually inserted into the feed entrance 2 of the camera housing 1. Alternatively, the camera may also be adapted to reproduce sheets of transparent and non-transparent material manually inserted in the feed entrance 2 on a standard width film 10 mounted in the camera.

The advantages of the switching arrangement of this invention are as follows:

By one or more manipulations of the switches of instrument panel 2a the impulse transmitter causes the preselected pair of bordermarkings to be energized and the person servicing the machine can then immediately observe for what width of the sheet the machine has been adjusted. This is the only act required to be performed by the person servicing the machine of this invention. The other two adjustments, such as the selection of the correct objective lens and the correct traversing speed are effected completely automatically by the impulse transmitter. The possibility of malfunction of the device due to faulty adjustment of the person servicing the device is therefore reduced to a minimum.

Furthermore, the adjustments for the correct operation of the device take only a relatively short time.

Another important advantage to consider is the fact that less of the belt-type emulsion carrier is consumed because the camera no longer is required to be opened for each adjustment and consequently the undesired light exposure of the emulsion carrier due to the opening of the camera has been to a large extent eliminated. As a matter of fact, the camera forming part of this invention, needs only to be opened when the width of the emulsion carrier is to be changed. In the latter instance, the step of opening the camera housing 1 is unavoidable since the belt drive cylinder and the emulsion carrier magazines have to be exchanged. The advantage of the camera of this invention lies in the structural characteristics of the belt drive support which automatically connects the energizing circuits of the device to the second group of bordermarkings when the belt drive cylinders are exchanged.

The scope of this invention includes other embodiments than those illustrated in the figures. It is possible, for instance, to use a slidable plate support for the lenses instead of the objective lens disc 14 illustrated in FIGS. 2 and 3. The projecting cam surfaces 21 are then located on the slidable plate support opposite each lens support. In FIG. 3 the disc 14 is illustrated as supporting four objective lenses. This number of objective lenses in the camera is, however, arbitrary since it merely depends on the number of pairs of bordermarkings. It is therefore obviously within the scope of this invention to include further groups of pairs of bordermarkings and therefore additional objective lenses in the camera of this invention. It should also be noted that the number of electromagnetic clutches corresponds always to the number of objective lenses in the device. It should also be noted that the scope of this invention includes the feature wherein the objective lens disc or objective lens slidable plate support is powered by electromagnets in lieu of the electric motor 18.

Although the present invention has been described in conjunction with preferred embodiments, it is to be understood that other modifications and variations may be resorted to without departing from the spirit and scope of this invention, as those skilled in the art will readily understand. Such other modifications and variations are considered to be within the purview and scope of the invention and appended claims.

Having thus fully described my invention, what I claim as new and desire to secure by Letters Patent is:

1. In a microfilm camera adapted to photographically reproduce drawings, blueprints, documents and the like on belt type emulsion carriers of different width, a switching arrangement, comprising in combination, an impulse transmitter, a plurality of pairs of bordermarkings mounted on the housing of said camera, said plurality of pairs of bordermarkings being electrically connected to said impulse transmitter, each pair when energized, indicating the minimum width which will be photographically reproduced on said belt type emulsion carrier, movable supporting means operatively supported in said camera, a plurality of lenses corresponding in number to said plurality of pairs of bordermarkings mounted on said movable supporting means, electro-mechanical means electrically connected to said impulse transmitter and operatively connected to said movable supporting means for operatively positioning the same means, at least one belt drive cylinder rotatably mounted in said camera, a plurality of clutch means corresponding in number to said plurality of lenses operatively connected to said belt drive cylinder and electrically connected to said impulse transmitter; whereby when said impulse transmitter is manually adjusted a pre-selected pair of said plurality of pairs of bordermarkings is energized, a corresponding lens of said plurality of lenses is moved into an operative position by said movable supporting means, and a corresponding clutch of said plurality of clutch means is moved into an operative position with respect to said belt drive cylinder.

2. The switching arrangement as set forth in claim 1, wherein said impulse transmitter includes an instrument panel on the housing of said camera, having manual adjustment means.

3. The switching arrangement as set forth in claim 1, wherein said impulse transmitter includes electro-optical means mounted in said camera, adapted to scan the sheet that is to be photographically reproduced.

4. The switching arrangement as set forth in claim 1, wherein said movable supporting means are adapted to position a pre-selected lens into the path of the exposure light beam of said camera, said movable supporting means including an electrical limit switch operatively connected thereto and to said electro-mechanical means, said impulse transmitter being adapted to switch said electro-mechanical means on and said electrical limit switch being adapted to switch said electro-mechanical means off after a pre-selected lens of said plurality of lenses has been moved into an operative position.

5. The switching arrangement as set forth in claim 1, wherein said belt drive cylinder is mounted on a rotatable first shaft, a plurality of belt pulleys of equal diameter corresponding in number to said plurality of lenses rigidly secured to said first shaft, a second shaft rotatably mounted in said camera, a plurality of electro-magnetic clutch means of different diameter corresponding in number to said plurality of belt pulleys operatively mounted on said second shaft and electrically connected to said impulse transmitter, an electric drive motor operatively connected to said second shaft, and a plurality of belts, each clutch of said plurality of clutches being connected one of said plurality of pulleys by one of said plurality of belts.

6. The switching arrangement as set forth in claim 1, wherein said belt drive cylinder is interchangeable with a cylinder of different width and said plurality of pairs of bordermarkings is mounted in two groups on said housing, and including adjustable supporting means for said interchangeable belt drive cylinder, comprising a rotatable shaft supporting said cylinder, said shaft having an axial bore, a rod slidably mounted in said bore an electric switch having at least two contacts operatively connected to said rod, each of said two contacts being electrically connected to said two groups of pairs of bordermarkings, each group of said pairs of bordermarkings being operatively connected with a group of said plurality of lenses and a group of said plurality of clutch means by said impulse transmitter.

7. The switching arrangement as set forth in claim 1, wherein said electro-mechanical means comprise an electrical motor and a reducing gear train operatively connected to said motor and to said movable supporting means.

References Cited by the Examiner

UNITED STATES PATENTS

| | | | |
|---|---|---|---|
| 2,420,023 | 5/1947 | Wekeman | 88—24 |
| 2,625,851 | 1/1953 | Gelb | 88—24 |
| 2,748,651 | 6/1956 | Simjian | 88—24 |
| 2,790,362 | 4/1957 | Higonnet et al. | 88—24 |

NORTON ANSHER, *Primary Examiner.*

R. A. WINTERCORN, *Assistant Examiner.*